United States Patent
Ahrens et al.

(10) Patent No.: US 9,948,641 B2
(45) Date of Patent: Apr. 17, 2018

(54) METHOD AND DEVICES FOR PROVIDING A SUBSCRIPTION PROFILE ON A MOBILE TERMINAL

(71) Applicant: GIESECKE & DEVRIENT GMBH, München (DE)

(72) Inventors: Carsten Ahrens, München (DE); Bernd Müller, München (DE); Jens Dinger, München (DE); Andreas Morawietz, München (DE); Ulrich Huber, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/513,768

(22) PCT Filed: Sep. 22, 2015

(86) PCT No.: PCT/EP2015/001880
§ 371 (c)(1),
(2) Date: Mar. 23, 2017

(87) PCT Pub. No.: WO2016/045786
PCT Pub. Date: Mar. 31, 2016

(65) Prior Publication Data
US 2017/0295172 A1    Oct. 12, 2017

(30) Foreign Application Priority Data
Sep. 23, 2014   (DE) .................. 10 2014 014 078

(51) Int. Cl.
*H04W 4/00*    (2018.01)
*H04L 29/06*   (2006.01)
(Continued)

(52) U.S. Cl.
CPC ........ *H04L 63/0853* (2013.01); *H04L 67/306* (2013.01); *H04W 12/04* (2013.01); *H04W 12/06* (2013.01); *H04W 12/08* (2013.01)

(58) Field of Classification Search
CPC .............................. G06F 21/43; H04W 16/18
(Continued)

(56) References Cited

U.S. PATENT DOCUMENTS

2006/0105740 A1*  5/2006  Puranik ................... H04M 3/16
                                                                 455/410
2012/0316941 A1* 12/2012  Moshfeghi ............. G06Q 30/02
                                                                 705/14.16

(Continued)

FOREIGN PATENT DOCUMENTS

| EP | 2701359 A1 | 2/2014 |
| GB | 2522044 A  | 7/2015 |

OTHER PUBLICATIONS

German Search Report for corresponding German Application No. 102014014078.4, Jul. 9, 2015.
(Continued)

*Primary Examiner* — Kiet Doan
(74) *Attorney, Agent, or Firm* — Workman Nydegger

(57) ABSTRACT

A method and a system are provided for providing a subscription profile on a mobile terminal for communication via a mobile communication network. The method comprises the following steps: the logging in of a first mobile terminal with a first subscription profile to a mobile communication network; the downloading of a second subscription profile to the first mobile terminal via the mobile communication network; and the forwarding of the second subscription profile from the first mobile terminal to a second mobile terminal via a communication channel.

9 Claims, 2 Drawing Sheets

(51) Int. Cl.
*H04L 29/08* (2006.01)
*H04W 12/08* (2009.01)
*H04W 12/06* (2009.01)
*H04W 12/04* (2009.01)

(58) Field of Classification Search
USPC .... 455/411, 418, 66.1, 456.1, 410; 709/201, 709/204, 223, 200; 370/280
See application file for complete search history.

(56) References Cited

U.S. PATENT DOCUMENTS

| | | |
|---|---|---|
| 2013/0303122 A1 | 11/2013 | Li et al. |
| 2014/0057558 A1 | 2/2014 | Cooper |
| 2014/0066011 A1 | 3/2014 | Bradley |
| 2014/0206313 A1 | 7/2014 | Spanel et al. |

OTHER PUBLICATIONS

International Search Report for corresponding International PCT Application No. PCT/EP2015/001880, Jan. 13, 2016.

\* cited by examiner

METHOD AND DEVICES FOR PROVIDING A SUBSCRIPTION PROFILE ON A MOBILE TERMINAL

FIELD OF THE INVENTION

The invention relates to communication via mobile communication networks in general and in particular to methods and devices for providing a subscription profile on a mobile terminal for communication via a mobile communication network.

BACKGROUND OF THE INVENTION

Communicating by means of a mobile terminal, for example by means of a mobile telephone, via a mobile communication network (also referred to as PLMN [public land mobile network]), which is operated by a network operator (also referred to as MNO [mobile network operator]), usually requires that the mobile terminal is equipped with a security element or subscriber identification module, for example in the form of a SIM card, for securely receiving subscription authorization data ("subscription credentials"), which usually form part of a subscription profile and uniquely identify and authenticate the user of the mobile terminal vis-à-vis the mobile communication network. Such subscription authorization data, for example an IMSI (international mobile subscriber identity) and an authentication key $K_i$, have in the past conventionally been stored on the security element within the framework of a so-called "personalization" in the secure environment of the security element manufacturer.

While in the past the vast majority of security elements in the form of SIM cards could be exchanged easily in a mobile terminal, for some time there have existed more and more security elements that are permanently installed in a mobile terminal. Such a security element permanently installed in a mobile terminal that is known to the person skilled in the art in particular under the term "embedded SIM" or "embedded UICC (eUICC)" can usually no longer be personalized in a secure environment at the manufacturer of the security element, since the field of application in particular of the security element is not known in advance.

Thus, there is a need for improved methods and devices for personalizing a mobile terminal, that is, for providing a subscription profile on a mobile terminal, in particular on the security element thereof.

SUMMARY OF THE INVENTION

The above object is achieved in accordance with the present invention by the respective subject matter of the independent claims. Preferred embodiments of the invention are defined in the dependent claims.

According to a first aspect of the invention, a method is provided for providing a subscription profile on a mobile terminal for communication via a mobile communication network. Therein the method comprises the following steps of: the logging in of a first mobile terminal with a first subscription profile in a mobile communication network; the downloading of a second subscription profile to the first mobile terminal via the mobile communication network; and the forwarding of the second subscription profile from the first mobile terminal to a second mobile terminal via a communication channel.

Preferably, after the step of forwarding the second subscription profile from the first mobile terminal to the second mobile terminal via the communication channel, the method comprises the further step of logging in of the second mobile terminal with the second subscription profile in a mobile communication network.

According to preferred embodiments of the invention, the mobile communication network in which the second mobile terminal logs in with the second subscription profile is said mobile communication network via which the second subscription profile has been downloaded to the first mobile terminal.

Preferably, the communication channel between the first mobile terminal and the second mobile terminal is an NFC communication channel, a WiFi communication channel, a Bluetooth communication channel, an optical communication channel and/or an acoustic communication channel.

According to preferred embodiments of the invention, the second subscription profile is downloaded from a server to the first mobile terminal via the mobile communication network.

Preferably, the logical communication channel between the server and the second mobile terminal is secured cryptographically.

According to preferred embodiments of the invention, the logical communication channel between the server and the second mobile terminal is secured cryptographically by the second subscription profile being encrypted by the server with a key that is stored on the server in connection with an identifier of the second mobile terminal and/or a security element of the second mobile terminal.

According to a second aspect of the invention, a system is provided for providing a subscription profile on a mobile terminal for communication via a mobile communication network. Therein the system comprises: a first mobile terminal which is configured to log into a mobile communication network with a first subscription profile; a server for downloading a second subscription profile to the first mobile terminal via the mobile communication network; and a second mobile terminal which is configured such that the second subscription profile is forwarded from the first mobile terminal to the second mobile terminal via a communication channel.

As the person skilled in the art will recognize, the preferred embodiments described above can be implemented advantageously both within the framework of the first aspect of the invention, i.e. in the framework of the method for providing a subscription profile on a mobile terminal for communication via a mobile communication network, and within the framework of the second aspect of the invention, i.e. within the framework of a system for providing a subscription profile on a mobile terminal for communication via a mobile communication network.

BRIEF DESCRIPTION OF THE DRAWINGS

Further features, advantages and objects of the invention are indicated in the following detailed description of several exemplary embodiments and alternative embodiments. Reference is made to the figures, wherein there is shown.

DETAILED DESCRIPTION OF VARIOUS EMBODIMENTS

Figure 1:
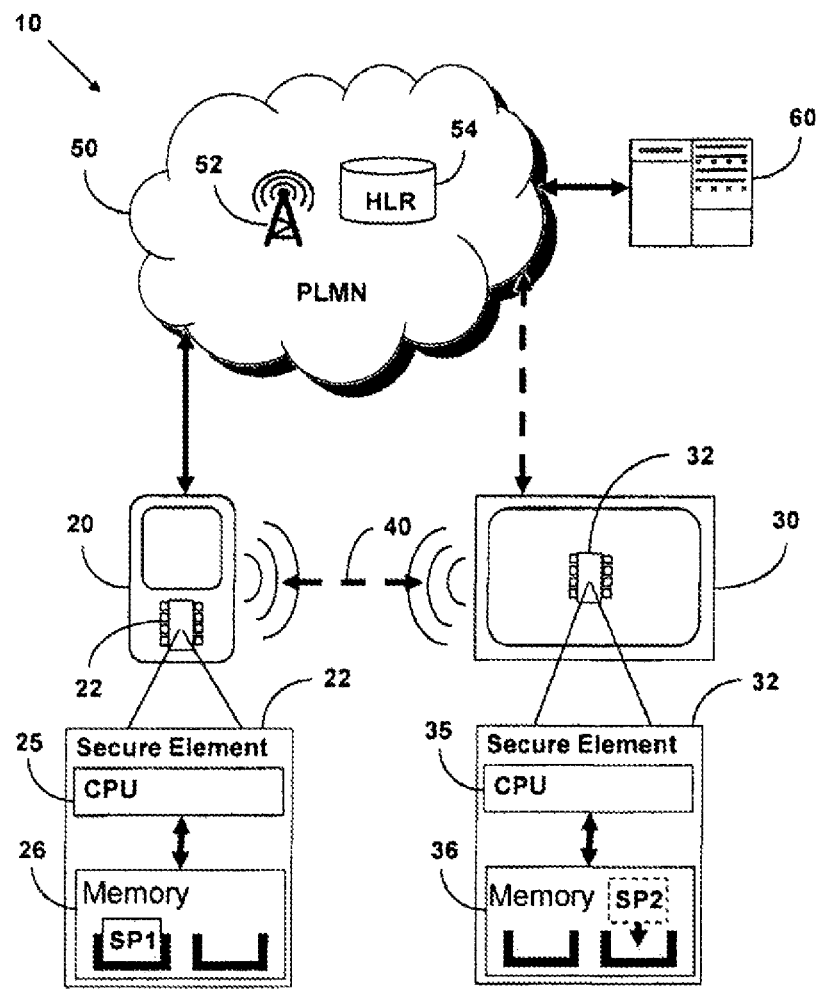
FIG. 1 a schematic representation of a communication system with a mobile communication system in communication with a first mobile terminal and a second mobile terminal, illustrating different aspects of the present invention, and FIG. 2 a schematic representation of a preferred sequence of providing a subscription profile on the second mobile terminal of FIG. 1.

FIG. 1 shows a schematic representation of the components of a communication system 10 as well as some of the communication connections between these components, illustrating different aspects of the present invention. Although in the following detailed description reference is made to a "mobile" terminal, the person skilled in the art will recognize that the present invention can be implemented advantageously in connection with any type of terminal which is configured to communicate via a mobile or cellular communication network, thus also with devices the location of which remains practically unchanged. In other words: the attribute "mobile" used herein refers to the terminal's capability of communicating via a mobile or cellular communication network.

In FIG. 1, a first mobile terminal 20 and a second mobile terminal 30 are exemplified. Preferably, the first mobile terminal 20 and the second mobile terminal 30 each have a security element ("secure element") 22 and 32 for securely storing and processing data which uniquely identify the first mobile terminal 20 and the second mobile terminal 30 in a mobile communication network, for example.

As indicated in FIG. 1, the first mobile terminal 20 is preferably a smart phone, and the second mobile terminal 30 is a tablet computer. The person skilled in the art will recognize, however, that the first mobile terminal 20 and the second mobile terminal 30 according to the present invention can be implemented also in the form of other devices adapted to communicate via a mobile communication network, such as a notebook, a TV system, a set-top box, a vending machine, an automobile, a surveillance camera, a sensor device, and the like.

According to preferred embodiments of the invention, the security element 22 and the security element 32 are configured as an eUICC (embedded universal integrated circuit card) with a SIM application implemented thereon, i.e. as a security element which is a permanent component of the first mobile terminal 20 or of the second mobile terminal 30 and is employed in a mobile communication network for the unique and secure identification of the user or subscriber and for providing different functions and value added services. Alternatively the security element 22 and/or the security element 32 can be configured as a UICC (universal integrated circuit card) or SIM card (subscriber identity module), which is known to the person skilled in the art as one of the forms of a security element currently most commonly used. The person skilled in the art will recognize, however, that other types of security elements, which, depending on the respective generation and type of the underlying mobile communication standard, are referred to as USIM, R-UIM, ISIM and the like, are likewise encompassed by the present invention According to further preferred embodiments of the invention, the security element 22 and/or the security element 32 can be formed as a combination of hardware and software components in a trustworthy part of an operating system of a central processing unit of the first mobile terminal 30 and/or of the second mobile terminal 30, which is also known to the person skilled in the art as a secure runtime environment ("trusted execution environment"; TEE). The security element 22 and/or the security element 32 can then be formed, for example, within such a secure runtime environment of the first mobile terminal 20 and/or of the second mobile terminal 30 in the form of programs running therein, so-called Trustlets®.

The first mobile terminal 20 and the second mobile terminal 30 are configured to communicate via the air interface with a mobile communication network 50 (also referred to briefly as "mobile communication network" or "public land mobile communication network" [PLMN]). For this purpose, the first mobile terminal 20 and the second mobile terminal 30 usually each have a suitably configured antenna (not represented in FIG. 1) for sending and receiving radio waves.

In the following, preferred embodiments of the invention will be described in connection with a mobile communication network 50 according to the GSM standard ("global standard for mobile communications"), which is specified in a multiplicity of ETSI specifications. The person skilled in the art will recognize, however, that the present invention can also be used advantageously in connection with other mobile communication networks. Such networks include third-generation (3GPP) mobile communication networks, such as UMTS (universal mobile telecommunications system), fourth-generation (4G) mobile communication network, such as LTE (long term evolution), and other mobile communication networks, such as CDMA and the like.

As is known to the person skilled in the art, a mobile communication network or PLMN constructed in accordance with the GSM standard generally comprises a BSS ("base station subsystem") consisting of a multiplicity of BTSs ("base transceiver station") which define respective radio cells of the PLMN and are connected to a BSC ("base station controller"). Usually the BSC is a multiplicity of BSCs which communicate with a common MSC ("mobile switching center"). Frequently, a local database, called VLR ("visitor location register"), forms part of the MSC to make available information about the mobile communication subscribers currently located in the radio cells which are supplied by an MSC (i.e. the region covered by a MSC). The MSC provides substantially the same functionality as a relay switch in the fixed network (public-switched telephone network; PSTN) and is in communication with an HLR ("home location register") which is the primary database of the PLMN in which information for the login and/or authentication of mobile communication subscribers is stored. For this purpose, the HLR usually has access to an AUC ("authentication center"). As is known to the person skilled in the art, the communication connections between the above-described components of a PLMN can be based on proprietary and/or open standards. The protocols employed can be SS7- or IP-based, for example. It is left up to the MNO how the network components are formed as separate or combined units and how the interfaces are formed between these components, so that the above description is to be understood merely as an example.

The person skilled in the art will recognize that, although the above-described functional units of a conventional mobile communication network according to the GSM standard can have different names in other or future mobile communication standards, the underlying principles are substantially equal and these are therefore also included by the invention. For the sake of clarity, of the above-described components of a mobile communication network there are shown merely the following in the schematic representation of FIG. 1: an exemplary BTS 52 and an HLR 54 for the mobile communication network 50.

As can be seen in FIG. 1, the mobile communication network is 50 is at least intermittently in communication with a background system 60, preferably in the form of an suitably configured "subscription management" server (SM server), as will be described in detail below.

As can be seen in the respectively magnified views of the security elements 22 and 32 in FIG. 1, these preferably each include a central processing unit or a central processor ("central processing unit"; CPU) 25 or 35. Preferably, the processor 25 or 35 is equipped such that applications can be executed on the processor 25 or 35, said applications providing at least some of the features for providing a subscription profile on the second mobile terminal 30, as will be described in detail below in connection with FIG. 2. Such applications are preferably implemented in the form of Java applets.

The security element 22 and the security element 32 each preferably further include a memory unit 26 or 36 which is preferably implemented as a non-volatile, re-writable memory unit, for example in the form of a flash memory. The memory unit 26 or 36 is configured to receive at least one subscription profile, for example the subscription profiles SP1 or SP2, as indicated schematically in FIG. 1.

In the schematic representation of FIG. 1, the subscription profile SP1 is already incorporated in the memory unit 26 of the security element 22 of the first mobile terminal 20, which means in particular that, for example, the CPU 25 of the security element 22 can access the subscription profile SP1. Preferably the subscription profile SP1 contains data that allow the security element 22 and the first mobile terminal 20 to log into the mobile communication network 50 and communicate via said network, i.e. data such as subscription authorization data ("subscription credentials"), an MNO-specific authentication algorithm and/or the like.

In the schematic representation of FIG. 1, the memory unit 36 of the security element 32 of the second mobile terminal 30 is ready for receiving the subscription profile SP2, which will be described in detail below with further reference to FIG. 2. Preferably, the subscription profile SP2 contains data that allow the security element 32 and the second mobile terminal 30 to log into the mobile communication network 50 and communicate via said network, i.e. data such as subscription authorization data ("subscription credentials"), an MNO-specific authentication algorithm and/or the like. Alternatively, the subscription profile SP2 can contain data that allow the security element 32 and the second mobile terminal 30 to log into a mobile communication network that is different from the mobile communication network 50, for example in the mobile communication network of a different mobile communication network operator.

Figure 2:
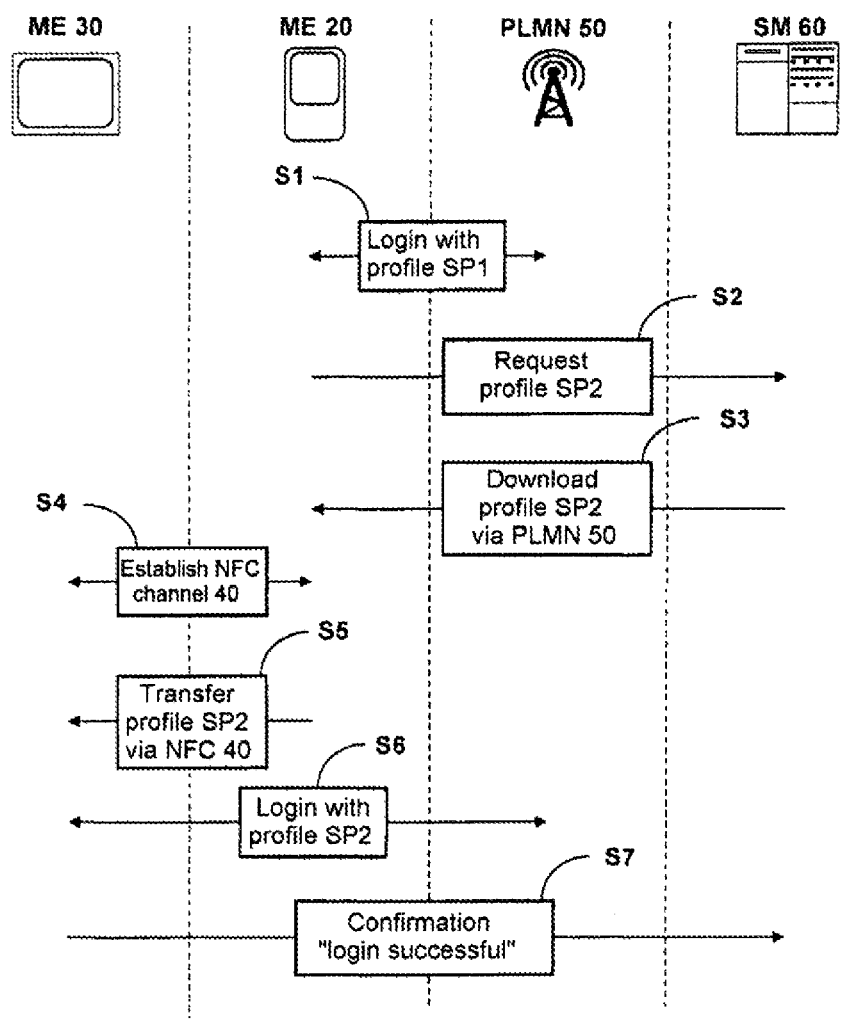

FIG. 2 shows a sequence preferred according to the invention of providing the subscription profile SP2 on the second mobile terminal 30.

In step S1 of FIG. 2, the first mobile terminal 20 logs into the mobile communication network 50 with the existing subscription profile SP1. This is effected within the framework of an authentication process employing the subscription authorization data that form part of the subscription profile SP1, such as an IMSI and/or an authentication key $K_i$.

After the first mobile terminal 20 has successfully logged into the mobile communication network 50 and can communicate via said network, in step S2 of FIG. 2 the first mobile terminal 20 requests a subscription profile SP2 for the second mobile terminal 30 from the SM server 60 via the mobile communication network 50. According to the invention it is conceivable that by means of an application running on the first mobile terminal 20 with a graphical user interface, a user can initiate this process and can in particular select the subscription profile S2 for the second mobile terminal 30.

Upon this request, in step S3 of FIG. 2 the SM server 60 loads the subscription profile SP2 selected by the user for the second mobile terminal 30 to the first mobile terminal 20 via the mobile communication network 50. The SM server 60 can trust the first mobile terminal 20 in doing so, since said terminal has authenticated itself vis-à-vis the mobile communication network 50.

In step S4 of FIG. 2, a communication channel 40 is established between the first mobile terminal 20 and the second mobile terminal 30. Since usually both the first mobile terminal 20 and the second mobile terminal 30 are available to the user and he can join the two terminals 20, 30, the communication channel 40 can be a communication channel with a short range. Preferably, said communication channel 40 is an NFC channel, a Bluetooth channel, WiFi channel or the like. Alternatively, a communication channel 40 is conceivable also in the form of an optical or an acoustic data transfer between the first mobile terminal 20 and the second mobile terminal 30. For example, the data can be represented on a display of the first mobile terminal 20, for example in the form of a QR code, and can be captured by means of a camera of the second mobile terminal 30.

After in step S4 of FIG. 2, the communication channel has been established between the first mobile terminal 20 and the second mobile terminal 30, in step S5 of FIG. 2 the subscription profile SP2 is transferred from the first mobile terminal 20 to the second mobile terminal 30 via the communication channel 40.

Thereupon, in step S6 of FIG. 2, the second mobile terminal or its security element 32 can log into the mobile communication network 50 with the subscription profile SP2 and the subscription authorization data contained therein, such as an IMSI and/or an authentication key $K_i$. As already mentioned above, the invention also covers the case that the subscription authorization data of the subscription profile SP2 allow access to a different mobile communication network, for example to the mobile communication network of a different mobile communication network operator.

If in step S6 the mobile terminal 30 has successfully logged into the mobile communication network 50, in step S7 of FIG. 2 the second mobile terminal 30 can send a corresponding confirmation to the SM server 60 via the mobile communication network 50.

As the person skilled in the art will recognize, in order to achieve the advantages provided by the present invention it is not required that the steps of FIG. 2 are effected in the order represented there. For example, it is conceivable within the scope of the invention that the step S4 for establishing the communication channel 40 between the first mobile terminal 20 and the second mobile terminal 30 is effected already before downloading the subscription profile SP2 to the first mobile terminal 20.

The steps S3 to S5 of FIG. 2 for downloading the subscription profile from the SM server 60 to the first mobile terminal 20 via the mobile communication network 50 and from the first mobile terminal 20 to the second mobile terminal 30 via the communication channel 40 can be considered as a logical communication channel between the SM server 60 and the second mobile terminal 30 in which the first mobile terminal 20 merely serves for forwarding the data. Preferably, the logical communication channel between the SM server 60 and the second mobile terminal 30 is secured cryptographically.

The cryptographic securing of the logical communication channel between the SM server 60 and the second mobile terminal 30 can for example be obtained in that a secret key is stored preferably on the security element 32 of the second mobile terminal 30, said key also being stored on the SM server 60 in connection with an identifier of the second mobile terminal 30 or of the security element 32, for example a chip ID. In this case, the second mobile terminal 30 would identify itself vis-à-vis the SM server 60 in an additional step not shown in FIG. 2, and the SM server 60 would encrypt the subscription profile SP2 with said key associated with said identifier. As the person skilled in the art will recognize, in this case the communication channel 40 between the first mobile terminal 20 and the second mobile terminal 30 can be established already at an earlier stage, in order to communicate the identifier, for example a chip ID of the security element 32 of the second mobile terminal 30, to the first mobile terminal 20. Here, it is conceivable that the first mobile terminal 20 requests the identifier of the second mobile terminal 30 or of the security element 32 from the SM server 60 via the mobile communication network 50 within the framework of requesting the second subscription profile SP2 (see step S2 of FIG. 2).

The invention claimed is:

1. A method for providing a subscription profile on a mobile terminal for communication via a mobile communication network, wherein the method comprises the following steps of:
   the logging in of a first mobile terminal with a first subscription profile to a mobile communication network;
   the downloading of a second subscription profile to the first mobile terminal via the mobile communication network; and
   the forwarding of the second subscription profile from the first mobile terminal to a second mobile terminal via a communication channel;
   wherein the first subscription profile and the second subscription profile comprise an IMSI and/or an authentication key Ki, and
   wherein the communication channel between the first mobile terminal and the second mobile terminal is an NFC communication channel, a WiFi communication channel, a Bluetooth communication channel, an optical communication channel and/or an acoustic communication channel.

2. The method according to claim 1, wherein, after the step of forwarding the second subscription profile from the first mobile terminal to the second mobile terminal via the communication channel, the method includes the further step of the logging in of the second mobile terminal with the second subscription profile to a mobile communication network.

3. The method according to claim 2, wherein the mobile communication network to which the second mobile terminal logs in with the second subscription profile is the mobile communication network via which the second subscription profile has been downloaded to the first mobile terminal.

4. The method according to claim 1, wherein the second subscription profile is downloaded from a server to the first mobile terminal via the mobile communication network.

5. The method according to claim 4, wherein the logical communication channel between the server and the second mobile terminal is secured cryptographically.

6. The method according to claim 5, wherein the logical communication channel between the server and the second mobile terminal is secured cryptographically in that the second subscription profile is encrypted by the server with a key that is stored on the server in connection with an identifier of the second mobile terminal and/or of a security element of the second mobile terminal.

7. A security element, wherein a subscription profile has been provided to the security element by means of the method according to claim 1.

8. A mobile terminal with a security element according to claim 7.

9. A system for providing a subscription profile on a mobile terminal for communication via a mobile communication network, wherein the system comprises:
   a first mobile terminal configured to log into a mobile communication network with a first subscription profile;
   a server for downloading a second subscription profile to the first mobile terminal via the mobile communication network; and
   a second mobile terminal configured such that the second subscription profile is forwarded from the first mobile terminal to the second mobile terminal via a communication channel;
   wherein the first subscription profile and the second subscription profile comprise an IMSI and/or an authentication key Ki, and
   wherein the communication channel between the first mobile terminal and the second mobile terminal is an NFC communication channel, a WiFi communication channel, a Bluetooth communication channel, an optical communication channel and/or an acoustic communication channel.

* * * * *